United States Patent
Kuroiwa (10) Patent No.: US 8,908,079 B2
(45) Date of Patent: Dec. 9, 2014

(54) ELECTRONIC CAMERA FOR PRODUCING QUICKVIEW IMAGES

(75) Inventor: Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 74 days.

(21) Appl. No.: 13/605,572

(22) Filed: Sep. 6, 2012

(65) Prior Publication Data

US 2012/0327285 A1 Dec. 27, 2012

Related U.S. Application Data (63) Continuation of application No. 12/805,558, filed on Aug. 5, 2010, now abandoned, which is a continuation of application No. 11/882,521, filed on Aug. 2, 2007, now abandoned, which is a continuation of application No. 10/320,661, filed on Dec. 17, 2002, now abandoned.

(30) Foreign Application Priority Data

Dec. 28, 2001 (JP) .................................. 2001-400744

(51) Int. Cl.
*H04N 5/222* (2006.01)
*H04N 1/21* (2006.01)
*H04N 5/232* (2006.01)

(52) U.S. Cl.
CPC ........... *H04N 1/2137* (2013.01); *H04N 1/2112* (2013.01); *H04N 5/23293* (2013.01); *H04N 2121/00* (2013.01)
USPC ..................................... 348/333.1; 348/222.1

(58) Field of Classification Search
USPC .................. 348/220.1, 222.1, 333.01, 333.11
See application file for complete search history.

(56) References Cited

U.S. PATENT DOCUMENTS

| | | | |
|---|---|---|---|
| 6,137,534 A * | 10/2000 | Anderson | .................. 348/222.1 |
| 6,292,218 B1 | 9/2001 | Parulski et al. | |
| 6,847,388 B2 * | 1/2005 | Anderson | ................ 348/333.05 |
| 6,862,040 B1 | 3/2005 | Sawachi | |
| 6,963,374 B2 | 11/2005 | Nakamura et al. | |
| 6,995,793 B1 | 2/2006 | Albadawi et al. | |
| 7,424,207 B2 | 9/2008 | Nishikawa et al. | |

FOREIGN PATENT DOCUMENTS

JP A-2000-156802 6/2000

* cited by examiner

*Primary Examiner* — Gevell Selby
(74) *Attorney, Agent, or Firm* — Oliff PLC (57) ABSTRACT

An electronic camera according to the present invention includes: an image pickup part for picking up a subject image to produce image data; a processing part for processing the image data outputted from the image pickup part to produce a quickview image for monitor display and also produce image data for record on a recording medium; and a monitor part for displaying the quickview image. The processing part commences displaying the quickview image on the monitor part prior to the production of the image data for record. This processing allows the display of the quickview image to be commenced without waiting for completion of the production of the image data for record. Therefore, it is possible to shorten the time lag occurring at displaying the quickview image, thereby improving the convenience of the electronic camera.

8 Claims, 7 Drawing Sheets

ELECTRONIC CAMERA FOR PRODUCING QUICKVIEW IMAGES

This is a Continuation of application Ser. No. 12/805,558, filed Aug. 5, 2010, which is a Continuation of application Ser. No. 11/882,521, filed Aug. 2, 2007, which is a Continuation of application Ser. No. 10/320,661, filed Dec. 17, 2002. The disclosure of the prior applications are hereby incorporated by reference herein in their entirety. The disclosure of the following priority application is herein incorporated by reference: Japanese Patent Application No. 2001-400744, filed Dec. 28, 2001.

BACKGROUND OF THE INVENTION

1. Field of the Invention

The present invention relates to an electronic camera that internally processes image data obtained by picking up subject images. More particularly, the present invention relates to an electronic camera that produces image data for record to be recorded on a recording medium and quickview images for monitor display.

2. Description of the Related Art

In conventional electronic cameras, the following procedures are performed to process image data.

1) Image Capture

An electronic camera reads image data from its internal image sensor. The electronic camera implements signal processings on the image data, such as A/D conversion, defective pixel correction, optical black-level correction, gain adjustment, white balance adjustment, tone correction and so on. The signal-processed image data are stored in a buffer memory within the electronic camera.

2) Image Processing

The electronic camera implements image processings on the signal-processed image data, such as color interpolation, color coordinate transformation, color correction, special frequency filtering and so on, and thereby produce image data for record.

3) Production of Quickview

The electronic camera reduces the image size of the image data for record to produce a quickview image.

4) Production and Compression of Thumbnail

The electronic camera reduces the image size of the image data for record to generate a thumbnail image for a display list. The electronic camera compresses the thumbnail image by use of a hardware or software processing.

5) Image Compression

The electronic camera image-compresses the image data for record by use of a hardware processing or the like.

6) Recording

The electronic camera implements file recording of the image-compressed resultants on a recording medium.

The inventor of the present invention recognizes the following problems existent in the above-described processings.

(1) First Problem

In general, a user or operator of the electronic camera displays a quickview image on its monitor screen after capturing a subject image. He or she may use this quickview image on the photo-taking spot to determine whether the captured result is good or not. It is preferable that the user or operator can check the quickview without delay at the time of photographing. It is, therefore, desirable that the quickview image be produced as soon as possible after the capturing of the subject image.

In the foregoing example of the prior art, however, the image size of the image data for record has to be reduced for generation of the quickview image. In such a case, quick generation of the quickview image is difficult because there is a need for waiting for a completion of generation of the image data for record.

For the generation of image data for record, in general, it is necessary to process full-sized image data. Additionally, in order to improve the picture quality of the electronic camera, those image processings have to be high-level, complicated processings. This tends to elongate the time taken for the processings on the image data for record, and the generation of the quickview image delays accordingly.

For the reason above, the above-described example of the prior art is disadvantageous in terms of availability that a time lag is likely to occur from photographing to displaying the quickview image, so that the user cannot check the captured image smoothly.

(2) Second Problem

Reusing the quickview image during image reproduction can shorten the time required for the image reproduction on the monitor. To prepare for such reuse during image reproduction, it is necessary, when the image data for record is recorded, to record the quickview image together with the image data for record.

In the above-described example of the prior art, the electronic camera must additionally compress and recode the quickview image after completing the image compression of preceding image data for record. This elongates the time required for photographing by a time needed for performing the additional processings accordingly. Consequently, disadvantages such as a reduction in the speed of a continuous shooting are likely to arise.

SUMMARY OF THE INVENTION

In view of solving the above-described problems, it is an object of the present invention to decrease the time lag in displaying the quickview image.

The present invention will be now described below.

(1) An electronic camera according to the present invention includes: an image pickup part for picking up a subject image to produce image data; a processing part for processing the image data outputted from the image pickup part to produce a quickview image and image data for record, the quickview image being used for monitor display, the image data for record being to be recorded on a recording medium; and a monitor part for displaying the quickview image. The processing part commences displaying the quickview image on the monitor part before the production of the image data for record is completed.

In this processing, the display of the quickview image is commenced before the image data for record is generated. Thus, the quickview image can be quickly displayed without waiting for the completion of production of the image data for record. As a result, the time lag occurring at displaying the quickview image can be reduced, so that the user can review the captured image significantly smoothly.

(2) More preferably, the processing part of the electronic camera according to the present invention includes an image processing part and a quickview producing part. Upon receiving the image data outputted from the image pickup part, the image processing part image-processes the image data to produce the image data for record. On the other hand, the quickview producing part, upon receiving the image data outputted from the image pickup part, reduces the number of the pixels of the image data to produce the quickview image, and then commences the display of the quickview image before the image data for record is produced.

In this processing, the quickview image is produced from the output of the image pickup part. In such a case, the production processing of the quickview image is almost irreverent of the image processing of the image data for record. This lessens the time loss occurring due to the processings on the image data for record, thereby enabling quick production of the quickview image. As a result, the time lag occurring at displaying the quickview image can be reduced, so that the user can check the captured image significantly smoothly.

(3) Also preferably, the processing part of the electronic camera according to the present invention includes a buffer part, a reducing part and an image processing part. The buffer part temporarily stores the image data outputted from the image pickup part. Upon receiving the image data from the image pickup part or the buffer part, the reducing part reduces the number of the pixels of the image data to produce slimmed-down intermediate data (which will be referred to simply as "intermediate data" hereinafter). The image processing part firstly image-processes the intermediate data to produce the quickview image and thereafter image-processes the image data temporarily stored in the buffer part to produce the image data for record.

The slimmed-down intermediate data are produced first in this processing. Next, the image processing part preferentially image-processes the intermediate data, thereby producing the quickview image. The intermediate image can be produced at a high speed because it is produced by a relatively simple processing such as reducing the pixel number. Moreover, the production of the quickview image from the intermediate image can be completed at a high speed because the number of the pixels of the intermediate image to be processed is small. As a result, the time lag occurring at displaying the quickview image can be decreased, so that the user can review the captured image significantly smoothly.

Furthermore, since the reducing part produces the intermediate image, the number of the pixels which the image processing part processes for production of the quickview image is small, resulting in substantially lessening the amount of the processings by the image processing part. As a result, the image processing part has a margin to perform other processings in addition to the production processing of the quickview image. This margin of the image processing part is efficiently utilized. By utilizing this margin, the image processing part produces the image data for record after producing the quickview image. This eliminates the need to provide any independent image processing parts dedicated to the quickview images and to the image data for record, thereby simplifying the structure of the electronic camera.

(4) More preferably, the electronic camera according to the present invention further includes an image compressing part and a recording part. The image compressing part first image-compresses the quickview image and the image data for record next to produce their respective compressed data. The recording part first records the compressed data of the quickview image and the compressed data of the image data for record next.

According to the processings described above, the quickview image and image data for record are compressed and recorded in the same order which is the quickview image first, the image data for record second. In such a case, it is possible to complete the compression and recording of a preceding quickview image to some extent before the commencement of outputting the image data for record, which can further shortens the total processing time.

(5) Also preferably, the electronic camera according to the present invention changes the processings on the image data in the following manner when the image pickup part continuously picks up the subject image to produce a plurality of sets of image data. That is, the buffer part temporarily stores the plurality of sets of image data in order in which the sets of image data are outputted from the image pickup part. The image processing part reads the image data temporarily stored in the buffer part and produces image data for record. Then, the reducing part reduces the number of the pixels of the image data for record to produce quickview images.

According to the processings described above, in order to perform the continuous shooting, each set of image data for record is produced with priority to a respective quickview image. Each quickview image is produced by reducing the number of the pixels of a respective set of image data for record. In such a case, every time a set of image data for record is produced, the buffer part can release the corresponding memory space. This increases the usage efficiency of the buffer part, by which further increases the number of the frames to be continuously shot at one time. In addition, the memory capacity required for the buffer part may be reduced.

In the above case, each quickview image is produced later than its respective set of image data for record. During the continuous shooting, however, the user scarcely checks the quickview images so that the delay in producing the quickview images causes no significant problems.

It should be noted that in order to perform the continuous shooting, the production of the quickview images may be omitted, or the quickview images may be compressed or recorded after the continuous shooting. In such a case, it is possible to shorten the time required to process the image data of each frame, which makes it easier to increase the speed of the continuous shooting.

(6) More preferably, the electronic camera according to the present invention further includes an image compressing part for image-compressing the quickview images and the image data for record. When the image pickup part continuously picks up the subject image to produce the plurality of sets of image data, the electronic camera implements the processings as follows. That is, the buffer part temporarily stores the quickview images which are sequentially produced by the reducing part. The image compressing part receives the quickview images from the buffer part to image-compress the quickview images.

According to the processings described above, the quickview images, which are sequentially generated by the continuous shooting, are temporarily stored in the buffer part. The image compressing part receives the quickview images from the buffer part to implement image compression thereon. Therefore, in a case where the image compressing part alone performs most of data processings such as in the continuous shooting mode, the quickview images may be compressed at appropriate times (by utilizing, for example, free times of the image compressing part).

The quickview images are relatively small in content, and hence occupy small regions of the buffer part. The regions of the buffer part are less occupied when compression is performed at appropriate times than when a processing sequence where image data for record are stored in the buffer is performed. This results in easily securing extraneous regions of the buffer part for the buffering in the continuous shooting mode, and in increasing the possible number of frames to be continuously shot.

(7) Also preferably, the electronic camera according to the present invention includes an image compressing part for image-compressing the image data for record to produce compressed data thereof and a recording part for recording the compressed data of the image data for record. When the image pickup part continuously picks up the subject image to produce a plurality of sets of image data, the electronic camera implements processings as follows. That is, the buffer part temporarily stores the compressed data of the image data for record which are successively produced by the image compressing part. The recording part receives the compressed data of the image data for record from the buffer part and records them.

According to the processings described above, during the continuous shooting, the compressed data of the image data for record are temporarily stored in the buffer part. Upon receiving the compressed data of the image data for record from the buffer part, the recording part records them. Therefore, in a case where the image compressing part alone performs most of data processings such as in the continuous shooting mode, the quickview images may be compressed at appropriate times (by utilizing, for example, free times of the recording part).

The regions of the buffer part are less occupied when compression is performed at appropriate times than when a processing sequence where not-yet-compressed image data for record are stored in the buffer is performed. This results in easily securing extraneous regions of the buffer part for the buffering in the continuous shooting mode, and in increasing the possible number of frames to be continuously shot.

(8) More preferably, the foregoing processing part of the electronic camera according to the present invention further reduces the number of the pixels of the quickview image to produce a thumbnail image for a display list.

According to the processing described above, the pixels of the quickview image are reduced in number to produce the thumbnail image for the display list. In such a case, processing slimmed-down quickview images realizes quick creation of so that the thumbnail image.

It is particularly preferable that the image compression of the thumbnail image be performed by using image compressing means that is different from the image compressing part (for example, by software compression using an internal microprocessor or the like). This allows the image compression of the thumbnail image to be implemented without interfering with the image compressions of the image data for record and of the quickview image.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DETAILED DESCRIPTION OF THE PREFERRED EMBODIMENTS

Embodiments of the present invention will be described below with reference to the drawings.

<First Embodiment>

Figure 1:
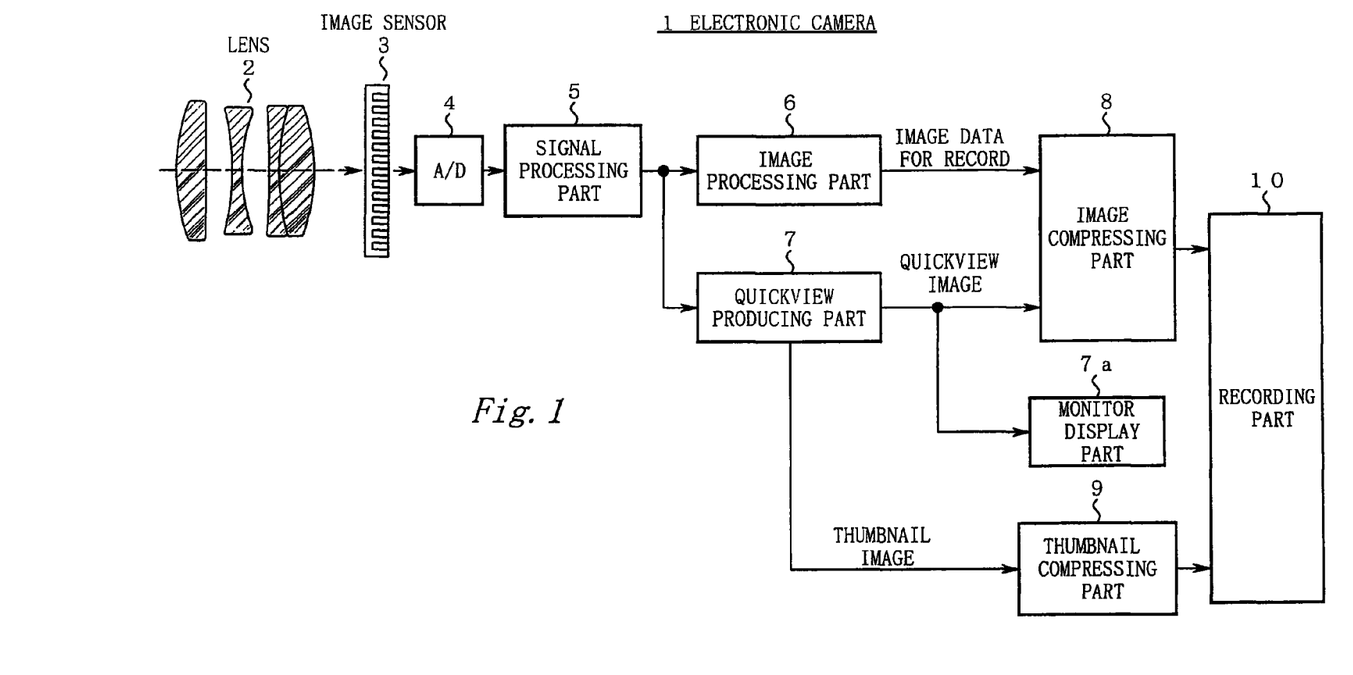
FIG. 1 is a block diagram showing the structure of an electronic camera 1 according to a first embodiment of the present invention.

FIG. 1 is a block diagram showing the structure of an electronic camera 1 according to a first embodiment of the present invention. The structure of the electronic camera 1 will be described below with reference to FIG. 1.

The electronic camera 1 has lenses 2 mounted thereon, and also has an image sensor 3 whose image plane is located in the image space of the lenses 2. An output of the image sensor 3 is supplied through an A/D converting part 4 to a signal processing part 5, an output of which is supplied to an image processing part 6 and also supplied to a quickview producing part 7.

The image processing part 6 implements image processings on the output supplied from the signal processing part 5 to produce image data for record, which are then supplied to an image compressing part 8.

On the other hand, the quickview producing part 7 produces a quickview image based on the output supplied from the signal processing part 5. The quickview image is supplied to the image compressing part 8, and also supplied to a monitor display part 7a and displayed thereon for monitoring. The quickview producing part 7 also produces a thumbnail image that is small in image size. The thumbnail image is outputted to a thumbnail compressing part 9.

The image compressing part 8 image-compresses the quickview image first and image data for record next to output their respective compressed data to a recording part 10. Meanwhile, the thumbnail compressing part 9 implements image compression of the thumbnail image to output the compressed data thereof to the recording part 10. The recording part 10 records these compressed data onto a recording medium such as a memory card or the like.

[Relation Between the Invention and the Present Embodiment]

The relations between the invention and the present embodiment will be described below. It, however, should be noted that such correspondence is intended to show an example of interpretation just for reference sake and is not intended to limit the present invention.

The image pickup part recited in the Claims corresponds to the image sensor 3, A/D converting part 4 and signal processing part 5.

The processing part recited in the Claims corresponds to the image processing part 6 and quickview producing part 7.

The monitor part recited in the Claims corresponds to the monitor display part 7a.

The image processing part recited in the Claims corresponds to the image processing part 6.

The quickview producing part recited in the Claims corresponds to the quickview producing part 7.

The image compressing part recited in the Claims corresponds to the image compressing part 8.

The recording part recited in the Claims corresponds to the recording part 10.

[Explanation of Operations of the First Embodiment]

Figure 2:
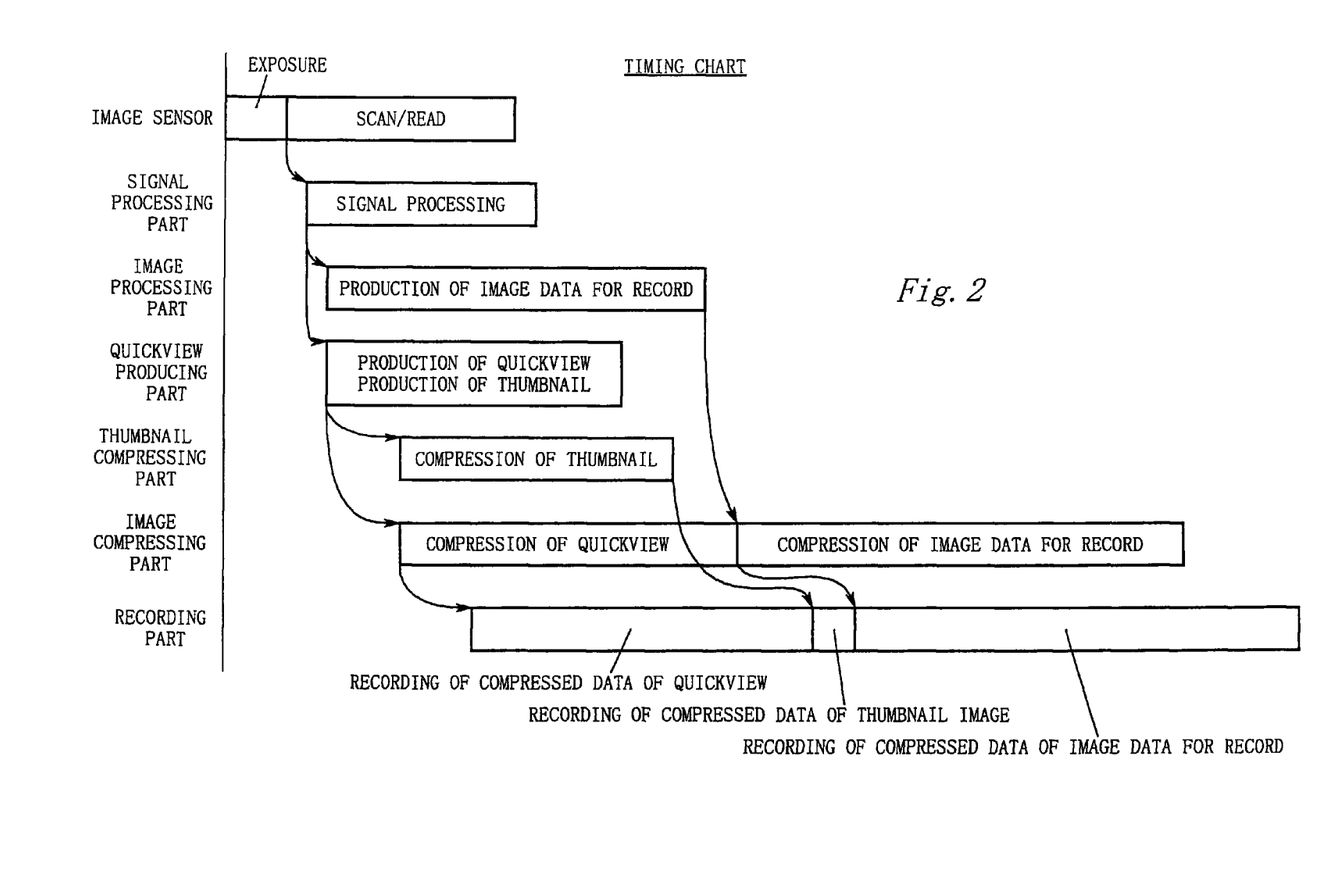
FIG. 2 is a timing chart showing operations of the electronic camera 1.

FIG. 2 is a timing chart showing operations of the electronic camera 1.

The operations of the electronic camera 1 will be explained below with reference to FIG. 2.

(1) Exposure

The lenses 2 focus a subject image onto the image plane of the image sensor 3. The image plane of the image sensor 3 includes a color filter array of a Bayer pattern or the like, which provides optical color separation of the subject image. The image sensor 3 implements photoelectric conversion of the thus separated color components (RGB or the like) pixel by pixel, and stores them as signal charges.

(2) Scan/Read

The image sensor 3 stores the signal charges for a predetermined exposure time period under a known electronic shutter control or with a mechanical shutter. Thereafter, the image sensor 3 outputs an image signal in accordance with a driving pulse supplied from a timing generator (not shown). The A/D converting part 4 A/D converts the image signal in real time to output digital image data.

(3) Signal Processing

The digital converted image data are inputted to the signal processing part 5, which executes processings on the image data in real time, such as defective pixel correction, optical black-level correction, gain correction, white balance correction, gamma correction and so on.

(4) Production of Image Data for Record

The image processing part 6 sequentially receives the real-time-processed image data from the signal processing part 5, and implements image processings on the image data, such as color interpolation processing, color correction processing, filter processing and so on, thereby producing image data for record. The image data for record are temporarily stored in an image memory (not shown) within the image processing part 6.

(5) Production of Quickview Image and Production of Thumbnail Image

The quickview producing part 7 sequentially receives the real-time-processed image data from the signal processing part 5. The quickview producing part 7 equally partitions the pixel pattern of the image data in accordance with the numbers of the vertical and horizontal pixels of a quickview image to be produced, thereby providing pixel blocks that are equal in number to the pixels of the quickview image. The quickview producing part 7 averages each sort of color components in each of the pixel blocks to provide the signal components of the quickview image. The monitor display part 7a displays the quickview image for monitoring. A user or operator can quickly review the last picked-up or captured image by viewing this monitor display.

It should be appreciated that a quickview image may be produced by thinning out the image data.

The quickview producing part 7 thins out the pixels of the produced quickview image, thereby further reducing the image size to produce a thumbnail image for a display list.

The productions of the quickview and thumbnail images described above are simple in operation and deal with small amounts of data as compared with the foregoing production of the image data for record. Therefore, the quickview and thumbnail images are generated earlier than the image data for record. Consequently, the earlier generated quickview image is outputted prior to the image data for record.

It should be noted that the foregoing "Production of quickview Image" and "Production of Thumbnail Image" are preferably implemented in a pipeline fashion.

(6) Thumbnail Compression

The thumbnail compressing part 9 receives the thumbnail image from the quickview producing part 7 and implements image compression thereof. The small compressed data are temporality held within the thumbnail compressing part 9 and outputted to the recording part 10 at a time when the recording part 10 is ready for recording.

(7) Quickview Compression

The image compressing part 8 receives the quickview image from the quickview producing part 7 and implements image compression thereof.

(8) Recording of Quickview Compressed Data

The recording part 10 receives the compressed data of the quickview image from the image compressing part 8 and sequentially records them.

(9) Compression of Image Data for Record

The image compressing part 8 receives, after completing the image compression of the quickview image, the image data for record from the image processing part 6, and implements image compression thereof.

(10) Recording of Compressed Data of Thumbnail Images

The recording part 10 receives, after completing the recording of the compressed data of the quickview images, the compressed data of the thumbnail images from the thumbnail compressing part 9, and records them in sequence.

(11) Recording of Compressed Data of Image Data for Record

The recording part 10 receives, after completing the recording of the compressed data of the thumbnail image, the compressed data of the image data for record from the image compressing part 8, and sequentially records them.

The series of operations explained above completes the imaging procedure of the electronic camera 1.

[Advantages of the First Embodiment]

As described above, in the first embodiment, the outputting of the quickview image is commenced prior to that of the image data for record. Therefore, the quickview image can be quickly displayed, so that the user can review the captured image quite smoothly.

Particularly, in the first embodiment, the quickview producing part 7 directly receives the image data from the signal processing part 5 to produce the quickview image. This allows the production of the quickview image to be commenced quickly without waiting for a completion of the time-consuming processings implemented by the image processing part 6. As a result, the time lag occurring at displaying the quickview image can be significantly reduced.

Besides, in the first embodiment, the production of the quickview image and that of the image data for record are performed in parallel. In this case, it is advantageous that the production of the image data for record does not delay since the production of the image data for record starts nearly at the same time as that of the quickview image.

Additionally, in the first embodiment, the outputting of the quickview image and that of the image data for record are commenced in the order named. The image compressing part 8 implements image compressions on them in this order. This allows the image compression of the quickview image to advance to some degree in parallel with the production of the image data for record, so that the whole processing time can be efficiently shortened.

Furthermore, in the first embodiment, the compressed data of the quickview image and that of the image data for record are produced in the order named. The recording part 10 implements the recordings of the compressed data in this order. This allows the recording of the compressed data of the quickview image to advance to some degree in parallel with the production of the image data for record, so that the whole processing time can be efficiently shortened.

Also, in the first embodiment, the quickview image is processed to produce the thumbnail image. In this case, only the slimmed-down quickview image needs to be processed, which enables quick production of the thumbnail image through a simple processing.

Next, another embodiment will be described below.

<Second Embodiment>

Figure 3:
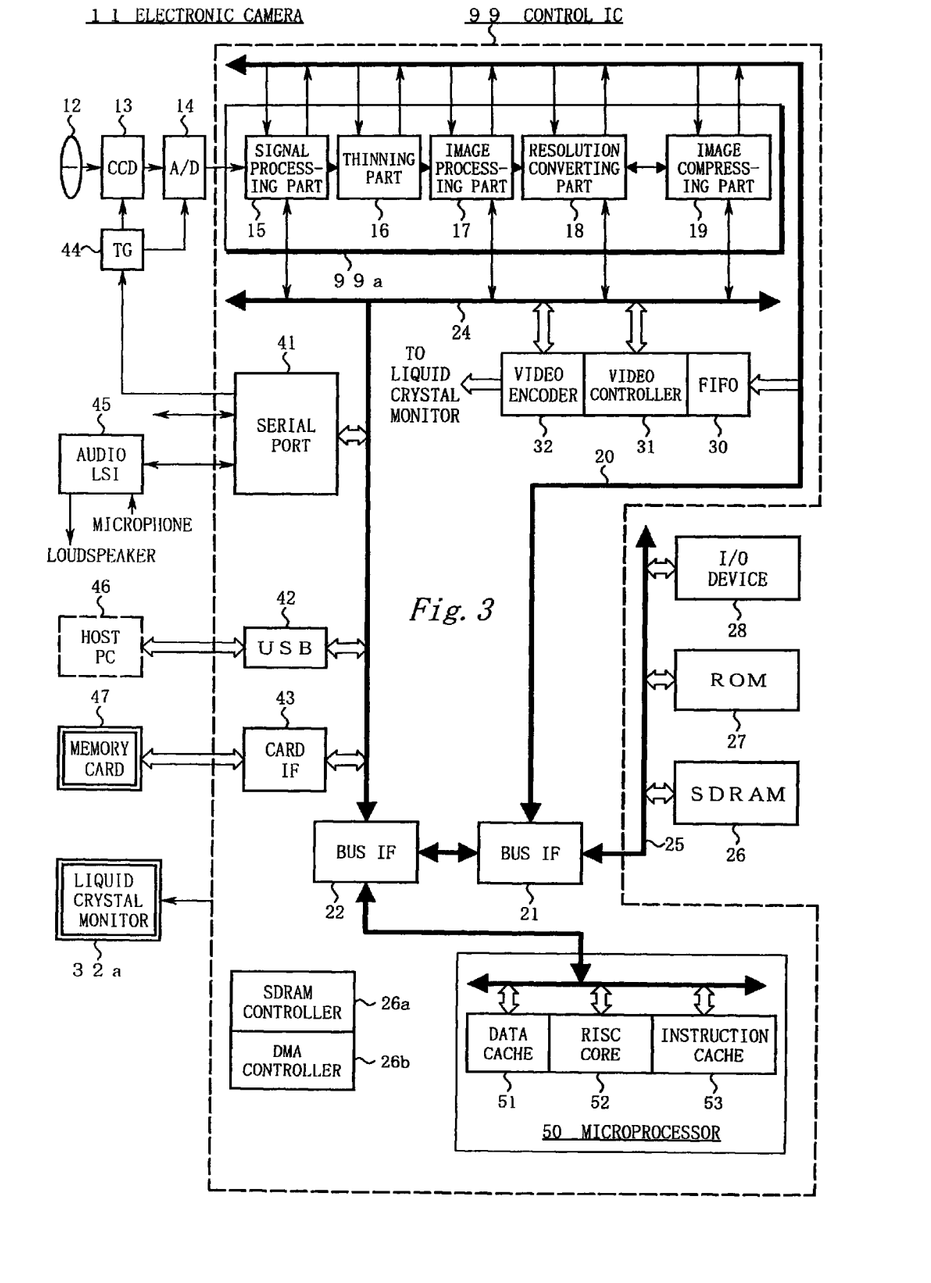
FIG. 3 is a block diagram showing the structure of an electronic camera 11 according to a second embodiment of the present invention.

FIG. 3 is a block diagram showing the structure of an electronic camera 11 according to a second embodiment. FIG. 3 shows a control IC 99 surrounded with dashed lines. The signal processing system of the electronic camera 11 is constituted of the control IC 99 and peripheral components.

The structure of the electronic camera 11 will be described below in detail.

The electronic camera 11 has a lens 12 mounted thereon, and also has an image sensor 13 whose image plane is located in the image space of the lens 12. Image data outputted from the image sensor 13 are supplied to an A/D converting part 14 to be digitalized thereby. The digitalized image data are then inputted to a signal processing engine 99a.

The signal processing engine 99a is constituted of processing blocks a signal processing part 15, a thinning part 16, an image processing part 17, a resolution converting part 18, an image compressing part 19 and so on. These processing blocks 15 through 19 are connected with one another via direct signal paths and via a picture bus 20.

A video controller 31, a video encoder 32 and so on are also connected to the picture bus 20 via a FIFO 30. A video signal outputted from the video encoder 32 is displayed on a liquid crystal monitor 32a provided on the back surface of the electronic camera 11.

The picture bus 20 is also connected to a system bus 24 and to an external bus 25 via bus interfaces 21 and 22 that switch bus connections. These bus interfaces 21 and 22 are controlled by a microprocessor 50 that will be described later.

The external bus 25 is connected to external components: a SDRAM (synchronous DRAM) 26, a ROM 27, an I/O device 28 and so on. In order to produce a control signal for the SDRAM 26, an SDRAM controller 26a is provided in the control IC 99. In order to realize a DMA (direct memory access) transfer without intervention of the microprocessor 50 that will be described later, a DMA controller 26b is also provided in the control IC 99.

On the other hand, the system bus 24 is connected to a serial port 41, a USB (Universal Serial Bus) 42 and a card interface 43. Port terminals of the serial port 41 are extended to the exterior to the control IC 99 and connected to an audio LSI 45, a timing generator 44 that drives the image sensor 13, and so on. A terminal of the USB 42 is also extended to the exterior to the control IC 99 and may be connected to an external host computer 46 if necessary. The card interface 43 writes data into a memory card 47 for data storage.

The control IC 99 also incorporates the microprocessor 50 for system control. The microprocessor 50 is constituted of a data cache 51, a RISC (Reduced Instruction Set Computer) core 52 that is an instruction executing unit, and an instruction cache 53.

[Correspondence Between the Invention and the Present Embodiment]

The correspondence between the invention and the present embodiment will be described below. It, however, should be noted that such correspondence is intended to show an example of interpretation just for reference sake and is not intended to limit the present invention.

The image pickup part recited in the Claims corresponds to the image sensor 13, A/D converting part 14 and signal processing part 15.

The processing part recited in the Claims corresponds to the thinning part 16, image processing part 17, resolution converting part 18, image compressing part 19, video controller 31 and microprocessor 50.

The monitor part recited in the Claims corresponds to the liquid crystal monitor 32a.

The buffer part recited in the Claims corresponds to the SDRAM 26.

The reducing part recited in the Claims corresponds to the thinning part 16 and resolution converting part 18.

The image processing part recited in the Claims corresponds to the image processing part 17.

The image compressing part recited in the Claims corresponds to the image compressing part 19.

The recording part recited in the Claims corresponds to the card interface 43 and microprocessor 50.

[Explanation of Operation of Single Shooting]

The electronic camera 11 described above has two shooting modes: a single shooting mode and a continuous shooting mode. An operation of the single shooting mode will be explained below first.

Figure 4:
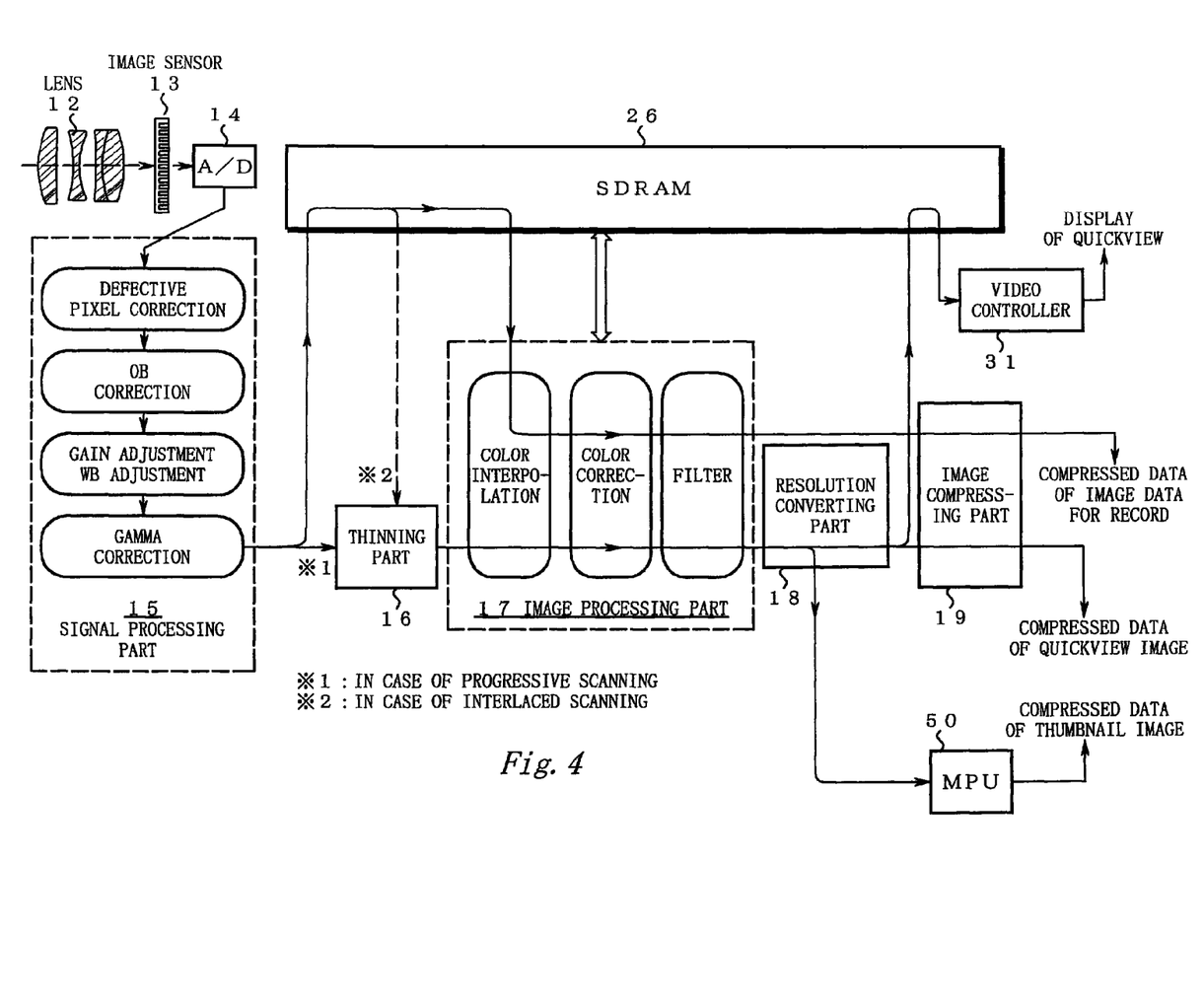
FIG. 4 is a diagram showing signal processing paths of the electronic camera 11 in a single shooting mode.

FIG. 4 is a diagram showing signal processing paths of the electronic camera 11 in the single shooting mode.

Figure 5:
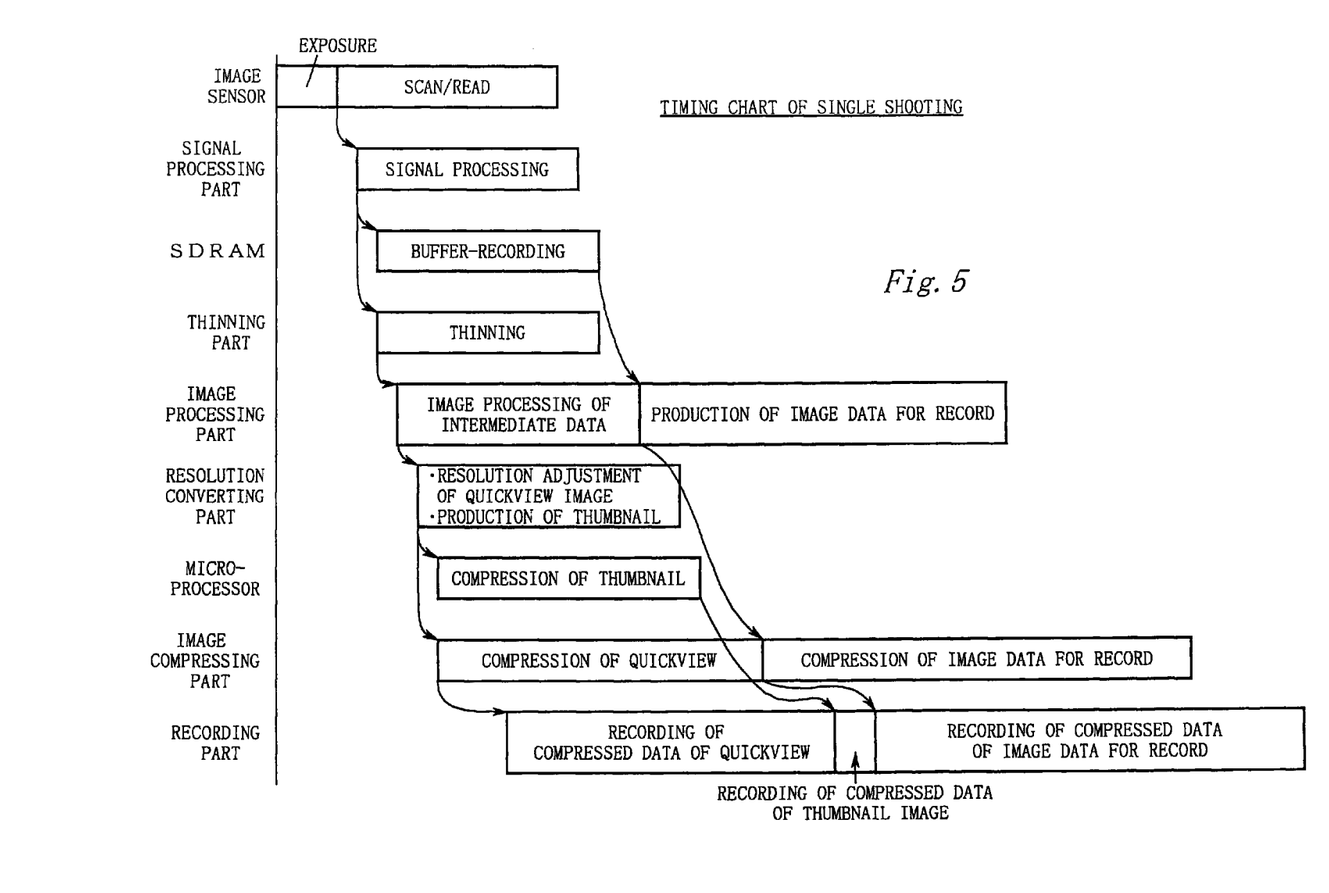
FIG. 5 is a timing chart of the electronic camera 11 in the single shooting mode.

FIG. 5 is a timing chart of the electronic camera 11 in the single shooting mode.

The operation of the single shooting mode will be now explained below with reference to FIGS. 3 through 5.

(1) Exposure

The image plane of the image sensor 13 includes a color filter array of a Bayer pattern or the like. The image sensor 13 performs, pixel by pixel, photoelectric conversion on color-separated lights through the color filter array, and stores them as signal charges.

(2) Scan/Read

The image sensor 13 stores the signal charges for a predetermined exposure time period, and thereafter outputs an image signal in accordance with a driving pulse supplied from the timing generator 44. The A/D converting part 14 A/D converts the image signal in real time to output digital image data.

(3) Signal Processing

The digital-converted image data are inputted to the signal processing part 15, which performing processings on those image data in real time, such as defective pixel correction, optical black-level (OB) correction, gain adjustment, white balance (WB) adjustment, gamma correction and so on.

(4) Buffer Storage

The image data outputted in real time from the signal processing part 15 are supplied to the thinning part 16, while they are temporarily stored in the SDRAM 26 via the picture bus 20 and external bus 25.

(5) Reduction

The thinning part 16 sequentially receives image data outputted in real time by the signal processing part 15. The thinning part 16 implements pixel number reduction (pixel thinning, pixel averaging or the like) on the image data to produce intermediate data in which the pixels have been reduced in number.

In the view of performing consistent processing, it is preferable that the intermediate data be subjected to a color interpolation equivalent to the color interpolation of image data for record that will be described later. Therefore, the thinning part 16 of the present embodiment implements pixel number reduction such that the color pattern of the image data and that of the intermediate data will coincide with each other.

In a case where the image sensor 13 is of interlace system, the image data of the first field are temporarily stored in the SDRAM 26, and subsequently the image data of the second field are outputted from the signal processing part 15. At this moment, the thinning part 16 preferably implements pixel number reduction each time a predetermined unit of data becomes available for the pixel number reduction.

(6) Image Processing of Intermediate Data

The image processing part 17 sequentially receives the intermediate data from the thinning part 16. The image processing part 17 sequentially implements the color interpolation processing, color correction processing and filter processing on the intermediate data.

(7) Resolution Adjustment of Quickview Image and Production of Thumbnail Image

The resolution converting part 18 receives the intermediate data image-processed by the image processing part 17. The resolution converting part 18 implements resolution conversion of the image-processed intermediate data to produce a quickview Image that has been adjusted in image size in accordance with the monitor resolution.

It should be noted that when the intermediate data and the quickview Image are equal to each other in resolution, the resolution conversion thereon is omitted.

The video controller 31 uses the SDRAM 26 or the like as a video memory to cause the quickview Image to be monitor-displayed. The user may view this monitor display to quickly review the last captured image.

Furthermore, the resolution converting part 18 reduces the number of the pixels of the produced quickview image to produce a thumbnail image for a display list.

(8) Compression of Thumbnail

The microprocessor 50 receives the thumbnail image from the resolution converting part 18 to implement compression of the thumbnail image based on a software processing. The compressed data of the thumbnail image are transferred to the SDRAM 26 to be temporarily stored therein.

It should be appreciated that the microprocessor 50 may use the SDRAM 26 as an input buffer to receive the thumbnail image. In such a case, the microprocessor 50 may receive the thumbnail image from the SDRAM 26 to implement the compression thereon independently of the timing at which the thumbnail image is produced by the resolution converting part 18. As a result, the microprocessor 50 may efficiently implement the compression on the thumbnail image, for example, during an interval between system controls such as switch monitoring and the like.

(9) Compression of Quickview

The image compressing part 19 receives the quickview Image from the resolution converting part 18 to implement the image compression thereof. The image compressing part 19 transfers the compressed data of the quickview Image to the SDRAM 26, which temporarily stores them therein.

It should be noted that the foregoing "Compression of Thumbnail" and "Compression of quickview" are preferably implemented in parallel.

(10) Recording of Compressed Data of Quickview

The microprocessor 50 (or DMA controller 26b) derives the compressed data of the quickview image from the SDRAM 26, and transfers them to the card interface 43 to sequentially record them in the memory card 47.

(11) Recording of Compressed Data of Thumbnail Image

After completing recording of the compressed data of the quickview image, the microprocessor 50 (or DMA controller 26b) derives the compressed data of the thumbnail image from the SDRAM 26, and transfers them to the card interface 43, which sequentially records them in the memory card 47.

(12) Production of Image Data for Record

After completing the image processings on the intermediate data, the image processing part 17 reads the image data buffer-stored in the SDRAM 26. The image processing part 17 then implements image processings on the image data, such as color interpolation processing, color correction processing, filter processing and so on, to produce the image data for record.

(13) Compression of Image Data for Record

After completing the image compression of the quickview image, the image compressing part 19 receives the image data for record from the image processing part 17 to implement image compression thereof. The image compressing part 19 transfers the compressed data of the image data for record to the SDRAM 26, which temporarily stores them therein.

(14) Recording of Compressed Data of Image Data for Record

The microprocessor 50 (or DMA controller 26b) derives the compressed data of the image data for record from the SDRAM 26, and transfers them to the card interface 43 to sequentially record them in the memory card 47.

The series of operations explained above completes the operation of the single shooting mode.

[Explanation of Operation of Continuous Shooting]

Next, an operation of the continuous shooting mode will be explained below.

Figure 6:
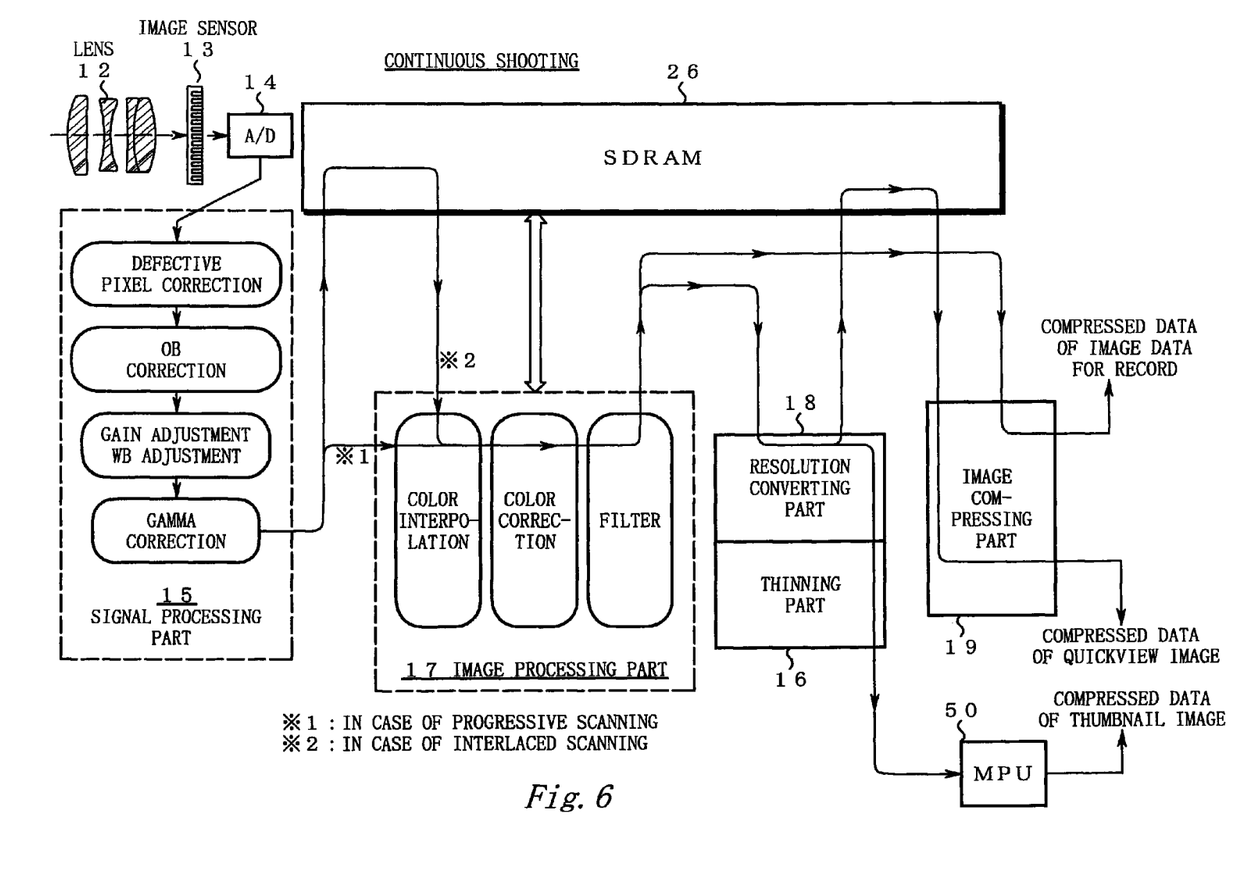
FIG. 6 is a diagram showing signal processing paths of the electronic camera 11 in a continuous shooting mode.

FIG. 6 is a diagram showing signal processing paths of the electronic camera 11 in the continuous shooting mode.

Figure 7:
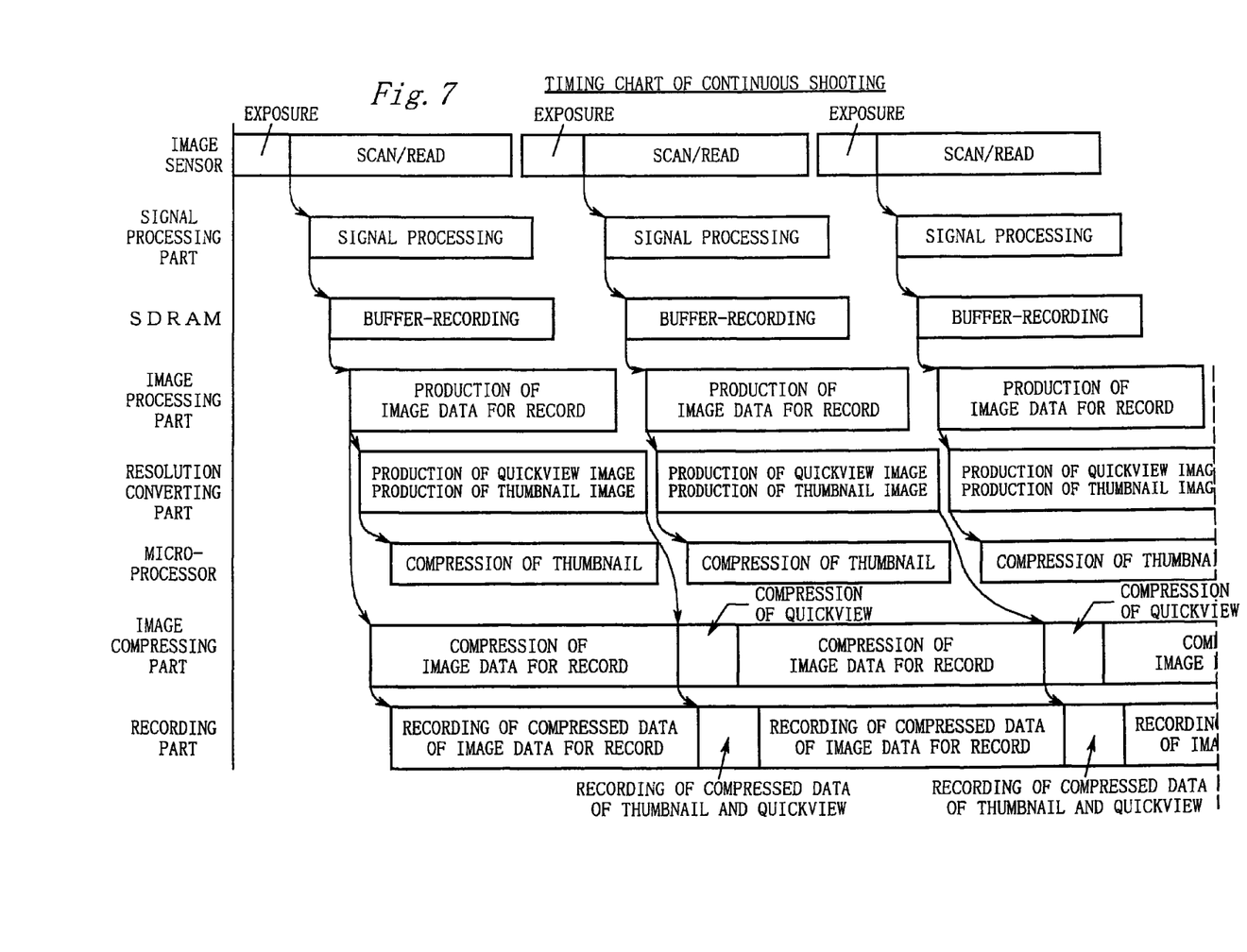
FIG. 7 is a timing chart of the electronic camera 11 in the continuous shooting mode.

FIG. 7 is a timing chart of the electronic camera 11 in the continuous shooting mode.

The operation of the continuous shooting mode will be now explained below with reference to FIGS. 3, 6 and 7.

(1) Exposure and Scan/Read

With its shutter release button (not shown) being pressed on, the electronic camera 11 continuously exposes and scans/reads the image sensor 13.

(2) Signal Processing

The signal processing part 15 implements processings in real time on the data of the images continuously picked up, such as defective pixel correction, optical black-level (OB) correction, gain adjustment, white balance adjustment, gamma correction and so on.

(3) Buffer Storage

The image data continuously outputted from the signal processing part 15 are supplied through the picture bus 20 and external bus 25 to the SDRAM 26 to be sequentially stored in continuous shooting buffer regions of the SDRAM 26.

(4) Production of Image Data for Record

The image processing part 17 reads the image data from the continuous shooting buffer regions of the SDRAM 26 in the picking-up order. The image processing part 17 then implements image processings on the image data, such as color interpolation processing, color correction processing, filter processing and so on, to produce the image data for record. It should be noted that in order to increase the number of the frames to be continuously shot at one time, the continuous shooting buffer regions from which the image data have been read for those image processings are immediately released and become usable as the latest continuous shooting buffer regions.

It also should be noted that in a case where the image sensor 13 is of interlace system, the image data of the first field are temporarily stored in the SDRAM 26, and subsequently the image data of the second field are outputted from the signal processing part 15. At this moment, the image processing part 17 preferably implements the above described image processings each time a predetermined unit of data becomes available for those image processings.

It also should be noted that in a case where the image sensor 13 is of progressive system, it may receive the image data directly from the signal processing part 15 as long as the image processing part 17 has no delay in processings.

(5) Compression of Image Data for Record

The image compressing part 19 receives the image data for record from the image processing part 17 to implement image compression thereof. The image compressing part 19 transfers the compressed data of the image data for record to the SDRAM 26, which temporarily stores them therein.

(6) Recording of Compressed Data of Image Data for Record

The microprocessor 50 (or DMA controller 26b) derives the compressed data of the image data for record from the SDRAM 26, and transfers them to the card interface 43 to sequentially record them in the memory card 47.

(7) Production of Quickview Image

The resolution converting part 18 receives the image data for record from the image processing part 17, and implements resolution conversion of the image data for record to produce a quickview Image, which is then transferred to the SDRAM 26 and temporarily stored in the processing buffer regions thereof.

(8) Production of Thumbnail Image

The thinning part 16 receives the quickview image from the resolution converting part 18, and implements pixel number reduction (pixel thinning, pixel averaging or the like) of the quickview image to produce a thumbnail image for a display list.

It should be noted that the foregoing "Production of quickview Image" and "Production of Thumbnail Image" are preferably implemented in a pipeline fashion.

(9) Compression of Thumbnail

The microprocessor 50 sequentially receives the thumbnail image from the thinning part 16 to implement image compression thereof based on a software processing. The microprocessor 50 (or DMA controller 26b) transfers the compressed data of the thumbnail image to the SDRAM 26, which temporarily stores them therein.

It should be appreciated that the microprocessor 50 may use the SDRAM 26 as an input buffer to receive the thumbnail image. In such a case, the microprocessor 50 may receive the thumbnail image from the SDRAM 26 to implement the compression thereof, independently of the timing at which the thumbnail image is produced by the resolution converting part 18. As a result, microprocessor 50 may efficiently implement the compression of the thumbnail image, for example, during an interval between system controls such as a switch monitoring and the like.

(10) Compression of Quickview Image

The image compressing part 19, after completing the image compression of the image data for record, reads the quickview Image from the SDRAM 26 to implement the image compression thereof. The image compressing part 19 transfers the compressed data of the quickview Image to the SDRAM 26, which temporarily stores them therein.

(11) Recording of Compressed Data of Thumbnail and Quickview Images

After completing the recording of the compressed data of the image data for record, the microprocessor 50 (or DMA controller 26b) derives the compressed data of the thumbnail image from the SDRAM 26, and transfers them to the card interface 43, which records them in the memory card 47.

After completing the recording of the compressed data of the thumbnail image, the microprocessor 50 (or DMA controller 26b) derives the compressed data of the quickview image from the SDRAM 26, and transfers them to the card interface 43, which records them in the memory card 47.

The series of operations explained above completes the continuous shooting mode.

[Advantages of Second Embodiment]

As explained above, in the single shooting mode, the outputting of the quickview image is commenced prior to that of the image data for record. Therefore, the quickview image can be quickly displayed, so that the user can review the captured image quite smoothly.

Especially, when producing the quickview image, the electronic camera 11 produces first the intermediate data where the number of the pixels has been reduced. As a result, the electronic camera 11 only needs to implement image processings on the slimmed-down intermediate data so as to produce the quickview image. Thus, the quickview image can be quickly completed.

Besides, in the single shooting mode, the quickview image and the image data for record are generated at different timings from each other. Therefore, using the single image processing part 17 the quickview image and image data for record are smoothly image-processed. This eliminates the necessity for providing separate image processing parts respectively dedicated to the quickview image and the image data for record. As a result, the structure of the electronic camera 11 is simplified.

Also, in the single shooting mode, the outputting of the quickview image and that of the image data for record are commenced in the order named. The image compressing part 19 implements image compression on them in this order. Therefore, the quickview image can be compressed to some degree in parallel with the production of the image data for record. As a result, the whole processing time can be efficiently shortened.

Furthermore, in the single shooting mode, the compressed data of the quickview image and that of the image data for record are produced in the order named. The card interface 43 records their compressed data in this order. Therefore, while the image data for record are being produced, the recording of the compressed data of the quickview image can be advanced to some degree. As a result, the whole processing time can be efficiently shortened.

On the other hand, in the continuous shooting mode, the image data for record is preferentially generated, and the quickview images are generated by processing the image data for record. Thus, the image data for record are generated earlier, whereby the continuous shooting buffer regions of the SDRAM 26 can be released quickly one after another, resulting in increasing the possible number of frames in the continuous shooting.

As described above, in the second embodiment, the operations (6) through (11) indicated below are performed for each frame in the continuous shooting.

(6) Recording of compressed data of image data for record
(7) Production of quickview image
(8) Production of thumbnail image
(9) Compression of thumbnail
(10) Compression of quickview image
(11) Recording of compressed data of thumbnail and quickview images It, however, should be noted that all or a part of these operations (6) through (11) may be implemented after the end of the continuous shooting. In such a case, the time required for each exposure in the continuous shooting mode can be shortened, so that the speed of the continuous shooting can be significantly increased.

Especially, performing the operations (6), (10) and (11) after the continuous shooting can further increase the speed of the continuous shooting because these operations are time-consuming. (This is because the quickview images cannot be compressed during compression of the image data for record so that these three operations are likely to have to be sequential.) On the other hand, since the operations (7), (8) and (9) can be implemented concurrently with the compression of the image data for record, performing these operations (7), (8) and (9) for each frame will not significantly reduce the speed of the continuous shooting. In a case where the control operation of the MPU 50 is slow, however, it is preferable that the operation (9) be implemented after the completion of the continuous shooting so as not to reduce the speed of the continuous shooting.

In the second embodiment, the processing sequences are different between the single and continuous shootings. Consequently, the quickview image can be quickly displayed at the time of the single shooting, while the speed of the continuous shooting can be increased in the continuous shooting. However, the present invention is not limited thereto. For example, the above-described processing sequence of the continuous shooting mode may be performed in the single shooting mode.

The invention is not limited to the above embodiments and various modifications may be made without departing from the spirit and scope of the invention. Any improvement may be made in part or all of the components.

What is claimed is:

1. An electronic camera comprising:
   an image pickup unit that picks up and processes a subject image to produce image data;
   a processing unit that processes said image data to produce a quickview image and image data for record, the quickview image being used for monitor display, the image data for record being to be recorded on a recording medium; and
   a monitor unit for displaying said quickview image, wherein
      said processing unit commences displaying said quickview image on said monitor unit prior to a completion of production of said image data for record, and
      at least some part of a processing for producing said image data is performed concurrently with at least some part of a processing for producing one of said quickview image and said image data for record.

2. The electronic camera according to claim 1, wherein said processing unit comprises:
   an image processing unit for receiving said image data outputted from said image pickup unit to image-process said image data and produce said image data for record; and
   a quickview producing unit for receiving said image data outputted from said image pickup unit to reduce the number of pixels of said image data and to thereby produce said quickview image, and for commencing displaying said quickview image on said monitor unit prior to the completion of production of said image data for record.

3. The electronic camera according to claim 1, wherein said processing unit comprises:
   a buffer unit for temporarily storing said image data outputted from said image pickup unit;
   a reducing unit for receiving said image data from one of said image pickup unit and said buffer unit to reduce the number of pixels of said image data and to thereby produce slimmed-down intermediate data; and
   an image processing unit for producing said quickview image first by image-processing said intermediate data outputted from said reducing unit and for producing said image data for record second by image-processing said image data temporarily stored in said buffer unit.

4. The electronic camera according to claim 1, further comprising:
   an image compressing unit for compressing said quickview image first and said image data for record second to produce their respective compressed data; and
   a recording unit for recording the compressed data of said quickview image first and the compressed data of said produced image data for record second.

5. The electronic camera according to claim 3, wherein when said image pickup unit produces a plurality of sets of image data by continuously picking up a subject image,
   said buffer unit sequentially and temporarily stores said plurality of sets of image data outputted from said image pickup unit,
   said image processing unit reads said image data temporarily stored in said buffer unit and produces said image data for record, and
   said reducing unit reduces the number of pixels of said image data for record to produce said quickview images in sequence.

6. The electronic camera according to claim 5, further comprising
   an image compressing unit for compressing said quickview image and said image data for record, wherein when said image pickup unit produces the plurality of sets of image data by continuously picking up the subject image,
   said buffer unit temporarily stores said quickview images sequentially produced by said reducing unit, and
   said image compressing unit receives said quickview images from said buffer unit to compress said quickview images.

7. The electronic camera according to claim 5, further comprising:
   an image compressing unit for sequentially compressing said image data for record to produce compressed data thereof; and
   a recording unit for recording the compressed data of image data for record sequentially produced by said image compressing unit, wherein when said image pickup unit produces a plurality of sets of image data by continuously picking up a subject image,
   said buffer unit temporarily stores the compressed data of said image data for record sequentially produced by said image compressing unit, and
   said recording unit receives the compressed data of said image data for record from said buffer unit and records the received compressed data of said image data for record.

8. The electronic camera according to claim 1, wherein said processing unit reduces the number of pixels of said quickview image to produce a thumbnail image for a display list.

* * * * *